(12) United States Patent
Liu

(10) Patent No.: US 12,730,939 B2
(45) Date of Patent: Sep. 8, 2026

(54) THREAT DETECTION USING A MEASURED STORAGE DEVICE

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 133 days.

(21) Appl. No.: 18/506,449

(22) Filed: Nov. 10, 2023

(65) Prior Publication Data

US 2024/0176915 A1 May 30, 2024

Related U.S. Application Data

(60) Provisional application No. 63/385,481, filed on Nov. 30, 2022.

(51) Int. Cl.
*G06F 21/78* (2013.01)
*G06F 21/54* (2013.01)
*G06F 21/60* (2013.01)

(52) U.S. Cl.
CPC .............. *G06F 21/78* (2013.01); *G06F 21/54* (2013.01); *G06F 21/602* (2013.01)

(58) Field of Classification Search
CPC ......... G06F 21/78; G06F 21/54; G06F 21/602
See application file for complete search history.

(56) References Cited

U.S. PATENT DOCUMENTS 7,055,175 B1 * 5/2006 Le Pennec ............ G06F 21/565 713/188
2009/0089860 A1 * 4/2009 Forrester ............... H04L 9/0897 718/1
2012/0216049 A1 * 8/2012 Boivie .................... G06F 3/067 713/189
2014/0032915 A1 * 1/2014 Muzammil ........... H04L 9/3247 713/176
2017/0003956 A1 * 1/2017 Chang ..................... G06F 8/658
2017/0154184 A1 * 6/2017 Shivanna ................ G06F 8/654

* cited by examiner

*Primary Examiner* — Viet D Vu
(74) *Attorney, Agent, or Firm* — Greenberg Traurig

(57) ABSTRACT

The disclosed embodiments relate to detecting malicious data and in particular to a method that includes loading data from a storage device; loading secure identifying data (SID) associated with the data from a write-protected region of the storage device, the SID including a digest and at least one metadata field; comparing the at least one metadata field in the SID to a corresponding metadata field of the data; computing a current digest of the data; comparing the current digest to the digest in the SID; and validating the data when the at least one metadata field in the SID matches the corresponding metadata field of the data and the current digest matches the digest in the SID.

20 Claims, 5 Drawing Sheets

THREAT DETECTION USING A MEASURED STORAGE DEVICE

RELATED APPLICATIONS

The present application claims priority to Prov. U.S. Pat. App. Ser. No. 63/385,481 filed Nov. 30, 2022, the entire disclosures of which application are hereby incorporated herein by reference.

TECHNICAL FIELD

At least some embodiments disclosed herein relate to memory devices in general, and more particularly, but not limited to detecting threats and vulnerabilities in software using a measured storage device.

BACKGROUND

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
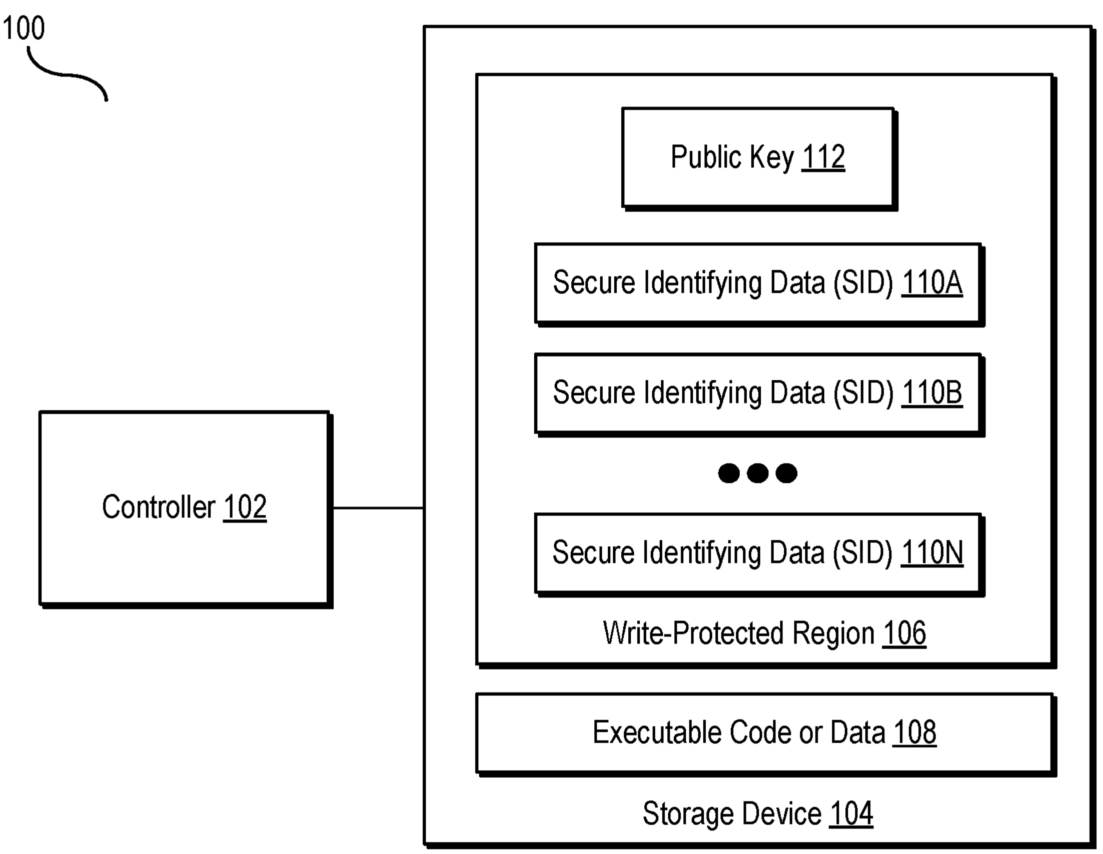
FIG. 1 is a block diagram of a storage system according to some embodiments of the disclosure.

The example embodiments relate to the use of a secure storage device that can perform automatic measurements of executable code to secure a boot process and provide real-time or near real-time detection of compromised, vulnerable, or otherwise insecure data (e.g., executable code) used by a computer system. The secure storage device includes a storage area that includes a write-protected region. This write-protected region can store secure identifying data (SID) for any desired data (e.g., boot loaders, operating systems, application code, user data, etc.). During boot, a computer system equipped with the secure storage device can compute a Device Identifier (DeviceID) using data stored in this write-protected region and can use the write-protected data to verify the security of lower level (e.g., bootloader, operating system) executable code. During operation, the computing system can validate arbitrary executable code or data by measuring the code or data and comparing the results to the expected measurements stored in the write-protected region.

In some aspects, the techniques described herein relate to a method including: loading data from a storage device; loading secure identifying data (SID) associated with the data from a write-protected region of the storage device, the SID including a digest and at least one metadata field; comparing the at least one metadata field in the SID to a corresponding metadata field of the data; computing a current digest of the data; comparing the current digest to the digest in the SID; and validating the data when the at least one metadata field in the SID matches the corresponding metadata field of the data and the current digest matches the digest in the SID.

In some aspects, the techniques described herein relate to a method, wherein loading data from the storage device includes loading executable code from the storage device.

In some aspects, the techniques described herein relate to a method, wherein loading data from the storage device includes loading the data from a writeable portion of the storage device.

In some aspects, the techniques described herein relate to a method, wherein the SID further includes a filename and size of the executable code.

In some aspects, the techniques described herein relate to a method, wherein the current digest is computed using the filename and size of the executable code.

In some aspects, the techniques described herein relate to a method, wherein the at least one metadata field includes one of a manufacturer, version, or build.

In some aspects, the techniques described herein relate to a method, wherein the current digest and the digest in the SID are generated using a one-way function.

In some aspects, the techniques described herein relate to a non-transitory computer-readable storage medium for tangibly storing computer program instructions capable of being executed by a computer processor, the computer program instructions defining steps of: loading data from a storage device; loading secure identifying data (SID) associated with the data from a write-protected region of the storage device, the SID including a digest and at least one metadata field; comparing the at least one metadata field in the SID to a corresponding metadata field of the data; computing a current digest of the data; comparing the current digest to the digest in the SID; and validating the data when the at least one metadata field in the SID matches the corresponding metadata field of the data and the current digest matches the digest in the SID.

In some aspects, the techniques described herein relate to a non-transitory computer-readable storage medium, wherein loading data from the storage device includes loading executable code from the storage device.

In some aspects, the techniques described herein relate to a non-transitory computer-readable storage medium, wherein loading data from the storage device includes loading the data from a writeable portion of the storage device.

In some aspects, the techniques described herein relate to a non-transitory computer-readable storage medium, wherein the SID further includes a filename and size of the executable code.

In some aspects, the techniques described herein relate to a non-transitory computer-readable storage medium, wherein the current digest is computed using the filename and size of the executable code.

In some aspects, the techniques described herein relate to a non-transitory computer-readable storage medium, wherein the at least one metadata field includes one of a manufacturer, version, or build.

In some aspects, the techniques described herein relate to a non-transitory computer-readable storage medium, wherein the current digest and the digest in the SID are generated using a one-way function.

In some aspects, the techniques described herein relate to a device including: a storage device, the storage device including a write-protected region and a writeable region; and a controller configured to: load data from the writable region; load secure identifying data (SID) associated with the data from the write-protected region, the SID including a digest and at least one metadata field; compare the at least one metadata field in the SID to a corresponding metadata field of the data; compute a current digest of the data; compare the current digest to the digest in the SID; and validate the data when the at least one metadata field in the SID matches the corresponding metadata field of the data and the current digest matches the digest in the SID.

In some aspects, the techniques described herein relate to a device, wherein loading data from the storage device includes loading executable code from the storage device.

In some aspects, the techniques described herein relate to a device, wherein loading data from the storage device includes loading the data from a writeable portion of the storage device.

In some aspects, the techniques described herein relate to a device, wherein the SID further includes a filename and size of the executable code.

In some aspects, the techniques described herein relate to a device, wherein the current digest is computed using the filename and size of the executable code.

In some aspects, the techniques described herein relate to a device, wherein the at least one metadata field includes one of a manufacturer, version, or build.

FIG. 1 is a block diagram of a storage system according to some embodiments of the disclosure.

The storage system 100 includes a controller 102 capable of executing computer program instructions (e.g., implementing the methods describe herein) and a storage device 104 comprising a non-transitory computer readable storage medium for tangibly storing computer program instructions and data. Various details of controller 102 and storage device 104 are provided in FIGS. 4 and 5 and are not repeated herein. In some implementations, controller 102 can also be configured to perform a secure boot process using, for example, a Device Identity Composition Engine (DICE) paradigm.

In an implementation, controller 102 can support an auto-measure function wherein controller 102 can automatically measure a portion of data stored in storage device 104 (e.g., executable code or data 108) and compare the instant measurement to a golden measurement. In some implementations, controller 102 can measure data stored in storage device 104 in response to an explicit command to perform a measurement while in other implementations, this measurement can be performed automatically (e.g., on reboot).

The storage device 104 can store various types of data. For example, storage device 104 can store executable code or data 108 in a first portion of the storage device 104. Executable code or data 108 may comprise various types of software such as low-level bootloader code, operating system code, application code, etc. The storage device 104 can also store data used by executable code or data 108. No limit is placed on the type of executable code or data stored by storage device 104.

The storage device 104 also includes a write-protected region 106. In some implementations, write-protected region 106 comprises a dedicated region of storage device 104 that is only writeable by a trusted entity. In some implementations, storage system 100 can store a public key 112 of an asymmetric key pair. In some implementations, the public key 112 can also be stored in the write-protected region 106. In some implementations, controller 102 can receive a command to write data to write-protected region 106. In some implementations, this command can be signed using a private key corresponding to the public key 112 stored by storage system 100. For example, a key management server (KMS) may write public key 112 to storage system 100 and issue commands to access write-protected region 106 that are signed with its private key. In such an implementation, write-protected region 106 may only be writeable by a trusted party and controller 102 may prevent writes from untrusted parties.

In some implementations, write-protected region 106 can store secure identifying data (SID) (e.g., SID 110A, SID 110B, . . . SID 110N). A given SID can correspond to one or more of executable code or data stored in the storage device 104. In brief, an SID comprises data describing aspects of the corresponding executable code or data (e.g., locations on the storage device, metadata, digests) that are provided by a distributor, manufacturer, or other trusted entity associated with the executable code or data. Specific details on the type of data that are included in a SID for a given piece of executable code or data are provided herein. As illustrated, executable code or data 108 can store multiple SIDs for multiple pieces of executable code or data and thus the following data may be replicated for each measured piece of executable code or data.

In some implementations, a given SID can include a measurement for the piece of executable code or data. For example, in a DICE architecture, the measurement can correspond to a TCI (Trusted Computing Base Component Identifier) for the piece of executable code or data. In some implementations, the measurement can comprise a fixed length measurement (e.g., a 32-bit hash value computing using a hash algorithm). In general, the measurement can comprise any type of digest of the executable code or data.

In some implementations, a given SID can also include a metadata struct, the metadata struct including locations in which the measurement is made from. These locations can take various forms depending on the piece of executable code or data. As a first example, the locations can include physical memory locations. Such physical locations may be suitable for lower-level software such as bootloader code. In some implementations, the locations may not be contiguous, and the metadata struct can be structured as follows (in pseudo-C code):

```
struct Metadata {
  char addr1[32];
  char size1[32];
  char addr2[32];
  char size2[32];
  // ...
  char addrN[32] = 0;
  char sizeN[32] = 0;
}
```

In the foregoing struct, N−1 locations are stored in the metadata struct. The final (N) location is set to zero to indicate the end of measurement locations. As illustrated, each measurement location is associated with an address (e.g., memory address or logical block address) and a corresponding size. In the specific example, both are 32 bits long, although the specific length and number of locations is not limiting.

As a second example, some executable code or data may not be amenable to physical address locations. For example, some pieces of executable code or data may be managed by a file system and thus the specific locations in executable code or data 108 may not be fixed. In such a scenario, the metadata struct can include (as an alternative) a filename and a length. In this second example, the metadata struct can be structured as follows (in pseudo-C code):

```
struct Metadata {
    char *filename;
    int64 length;
}
```

In the foregoing struct, a given piece of executable code or data may be identified by a filename (which the file system can access in lieu of physical storage or memory locations) and a corresponding length (which can comprise the length of the entire file or the length of the measured portion of the file). In some implementations, the metadata struct can also include an offset value which allows for reading a portion of the executable code or data that does not start at the beginning of the file.

In addition to a measurement and a metadata struct, a given SID can also include various additional metadata fields that describe the piece of executable code or data. Specifically, the SID can include one or more of a manufacturer (e.g., a string identifying who designed or otherwise is associated with the piece of executable code or data), a version (e.g., a string or integer representing the version number of the stored executable code or data), a build number (e.g., a string or integer representing a current build number of the stored executable code or data), and a TCI level. In some implementations, the TCI level may refer to the DICE layer corresponding to the piece of executable code or data associated with the SID. For example, if the operating system (Layer 1) loads the piece of executable code or data, the TCI level will be two. If a higher level piece of executable code or data calls the piece of executable code or data associated with the SID, the TCI level may be higher. The following is an example of the additional metadata fields for a Layer 3 piece of executable code spawned by the operating system:

Manufacturer: Acme Corp.
Version: 1.2.3
Build: 1234-rev
TCI Level: 2

As discussed above, the SID entries are stored in executable code or data 108 and thus can only be modified by a holder of the private key corresponding to public key 112. Thus, when a computer system using storage system 100 installs new code or persists secure data in executable code or data 108, any such persistence must be signed by the holder of the private key corresponding to public key 112. Thus, initial writes can be guaranteed secure. However, as will next be discussed, since code and data is not stored in write-protected region 106, it may be corrupted (either intentionally or accidentally) which can compromise a system using storage system 100.

For example, code or data can commonly be infected with computer viruses which essentially modify the code or data to perform functions not originally included in the code or data. Current approaches to preventing computer viruses rely on on-demand or real-time virus scanning. Both approaches require scanning code or data to detect known "signatures" of viruses or similar types of predictable indicators of malicious code. Such approaches have difficulties in detecting novel threats. Further, such approaches require the scanning of all data to detect such signatures which adds significant overhead to computing systems and wastes computational resources. The following methods utilize the aforementioned SIDs to improve the speed of virus and other threat detection.

Figure 2:
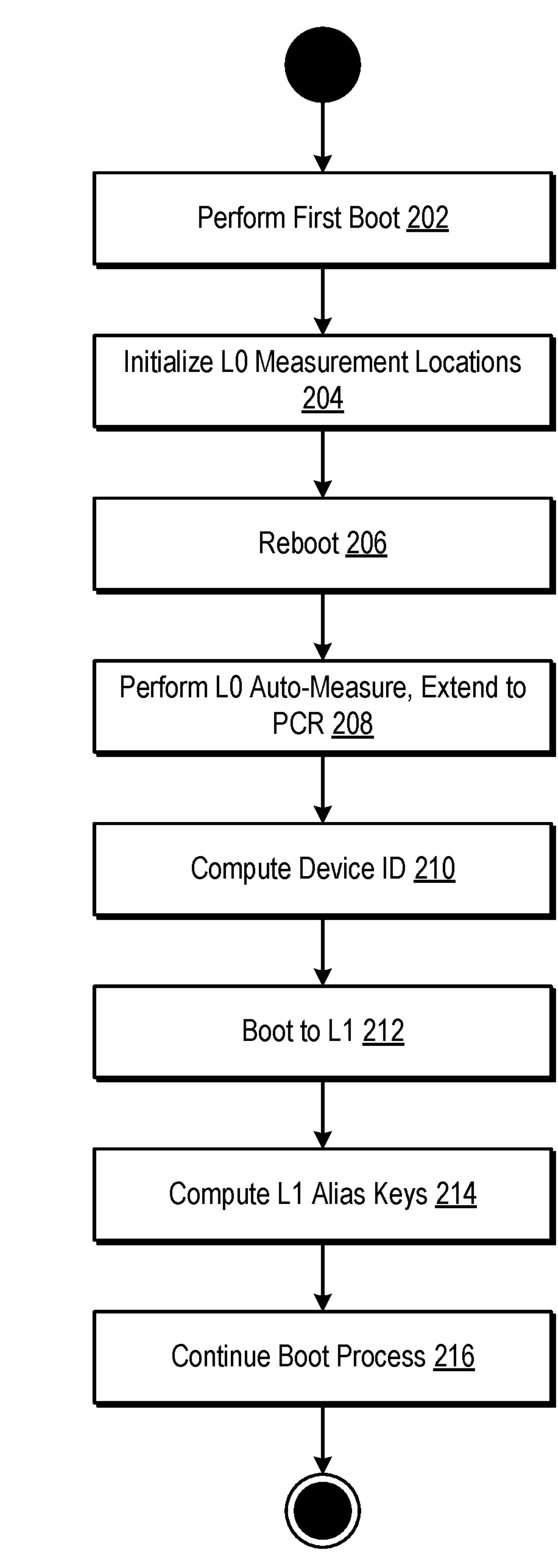
FIG. 2 is a flow diagram illustrating a method for securely booting a computing system according to some embodiments of the disclosure.

FIG. 2 is a flow diagram illustrating a method for securely booting a computing system according to some embodiments of the disclosure.

In step 202, method 200 can include booting a computing system. Specific details of booting a computer system are not described in detail herein. In one implementation, method 200 can include booting to an operating system (e.g., Linux). In some implementations, in step 202, method 200 boots the computing device without any measurement.

In step 204, method 200 can include initializing Layer 0 (L0) measurement locations. As used herein, L0 refers to the first layer executed after a DICE core executes. In general, L0 is frequently a bootloader (e.g., u-boot, UEFI, etc.). Further, as used herein Layer 1 (L1) refers to an operating system such as Linux, Windows®, MacOS®, iOS®, Android®, etc.

As described in FIG. 1, a write-protected region of a storage device may store various SID entries for executable code and/or data. In one implementation, one of these SID entries corresponds to the L0 code. In an implementation, the L0 code corresponds to a bootloader, such as u-boot code. In an implementation, step 204 can include copying the measurement location to a plurality of designated registers. For example, these registers can store measurement locations (e.g., memory addresses) and corresponding sizes of data to measure. For L0 code, these locations may be discontinuous as described above and may comprise physical memory or storage locations expected for a bootloader or similar code.

In step 206, method 200 can include rebooting the device. In general, any technique for rebooting a device may be used.

In step 208, method 200 can include performing an auto-measurement of the L0 code based on the measure locations loaded in step 204. In step 204, method 200 configures a set of registers to store the measure locations and sizes retrieved from the SID. Thus, during reboot, the system can access these locations and perform a measurement of the L0 code. In some implementations, step 208 can include storing the measurement in a designated register, such as a platform configuration register (PCR).

In this step, method 200 can include computing a hash of each location associated with the L0 code. For example, if the SID includes a list of measure locations (e.g., physical addresses) and sizes, method 200 can include measuring the data at these locations to generate a measurement of the L0 code. In some implementations, method 200 can include combining all of the code to be measured and computing a single measurement (e.g., hash) of the concatenated data. In some implementations, step 208 can be performed by a trusted layer of a DICE architecture and, in particular, the DICE core which is responsible for measuring the L0 code.

In some implementations, as part of step 208, method 200 can optionally include comparing the measured L0 code to the TCI measurement stored in the corresponding SID entry for the L0 code. In this implementation, method 200 can prematurely exit if the measurement and the TCI in the SID entry do not match (indicating a corrupted bootloader).

In step 210, method 200 can include generating a DeviceID. In some implementations, the DeviceID in step 210 corresponds to a DeviceID generated by a DICE core layer in a DICE system.

In existing DICE systems, a DeviceID comprises an Elliptic Curve Cryptography (ECC) asymmetric key pair asymmetric that authenticates a combination of device and firmware. In such existing systems, the DeviceID is stable for the life of the device and is never disclosed outside DICE Core.

In an implementation, the DeviceID computed in step 210 can be computed using the following process. First, method 200 can concatenate (and optionally zero pad) the L0 measurement locations and sizes. Method 200 can then compute a hash of the concatenated value using, as an example, a SHA-256 hash function to generate a metadata digest:

$$\text{Digest}=SHA256(0x00000000\|\text{Addr}_0\|\text{Size}_0\|\text{Addr}_1\|\text{Size}_1 \ldots \|\text{Addr}_n\|\text{Size}_n) \quad \text{Equation 1}$$

The values of $\text{Addr}_i$ and $\text{Size}_i$ correspond to the measurement locations and sizes of the L0 code as described with respect to FIG. 1. Since these values are stored in the write-protected region of the storage device, Digest represents a deterministic and secure digest of the SDI metadata struct.

Second, method 200 can compute a code by concatenating the metadata digest with the current L0 measurement:

$$\text{code}=\text{“}DID\text{”}\|\text{Digest}\|PCR_0 \quad \text{Equation 2}$$

Here, DID can comprise a string constant and $\text{PCR}_0$ comprises the current measurement of the L0 code as computed in step 208 (e.g., the current TCI of L0). In some implementations, the use of a string constant may be optional.

Third, method 200 can compute a component device identifier (CDI) for the L0 code as follows:

$$CDI_{L0}=KDF(UDS,\text{code}) \quad \text{Equation 3}$$

In some implementations, the CDI comprises a digest or hash of data. In Equation 3, KDF represents a key derivation function such as one that that complies with NIST SP800-56C recommendations (e.g., a hash-based message authentication code, HMAC) and UDS represents a unique device secret according to the DICE standard.

Fourth, method 200 can generate the DeviceID using the value of $\text{CDI}_{L0}$ and a random or pseudo-random nonce value:

$$\text{DeviceID}=SHA256(CDI_{L0}\|\text{nonce}) \quad \text{Equation 4}$$

In step 212, after computing the DeviceID, method 200 can include booting to the L1 code. In some implementations, as discussed, the L1 code may comprise an operating system of a computing system implementing method 200.

In step 214, method 200 can include computing L1 alias keys. In some implementations, these alias keys correspond to DICE Alias Key asymmetric key pairs that are generated by Layer 1 and above. In some implementations, the following process can be used to compute the Layer 1 alias keys.

First, method 200 may measure Layer 1 to generate $\text{TCI}_{L1}$ and store the measurement in a dedicated register. In some implementations, the generated TCI for Layer 1 can be compared to the TCI value stored in an SID corresponding to L1. In an implementation, the measuring of L1 can be performed by the L0 code (e.g., bootloader) and stored in the dedicated register for use by L1.

Next, method 200 may generate a CDI for L1 ($\text{CDI}_{L1}$). In some implementations, this $\text{CDI}_{L1}$ can be generated by the L0 code or may be generated from $\text{TCI}_{L1}$ by the L1 code. In either scenario, $\text{CDI}_{L1}$ can be generated as follows:

$$CDI_{L1}=KDF(CDI_{L0},TCI_{L1}) \quad \text{Equation 5}$$

Third, method 200 can generate the alias key as follows:

$$\text{AliasKey}_{L1}=SHA256(CDI_{L1})$$

In some implementations, the foregoing method of generate an alias key can be repeated at each layer, and only one layer (i.e., L1) is illustrated for simplicity.

Finally, in step 216, method 200 can include continuing a boot process. Specific details of continuing a boot process are not limiting and any upper layers after L1 may be executed (using similar techniques as described for L1) as part of a layered boot process. Further, in some implementations, higher layers may be executed according to method 300 described next.

Figure 3:
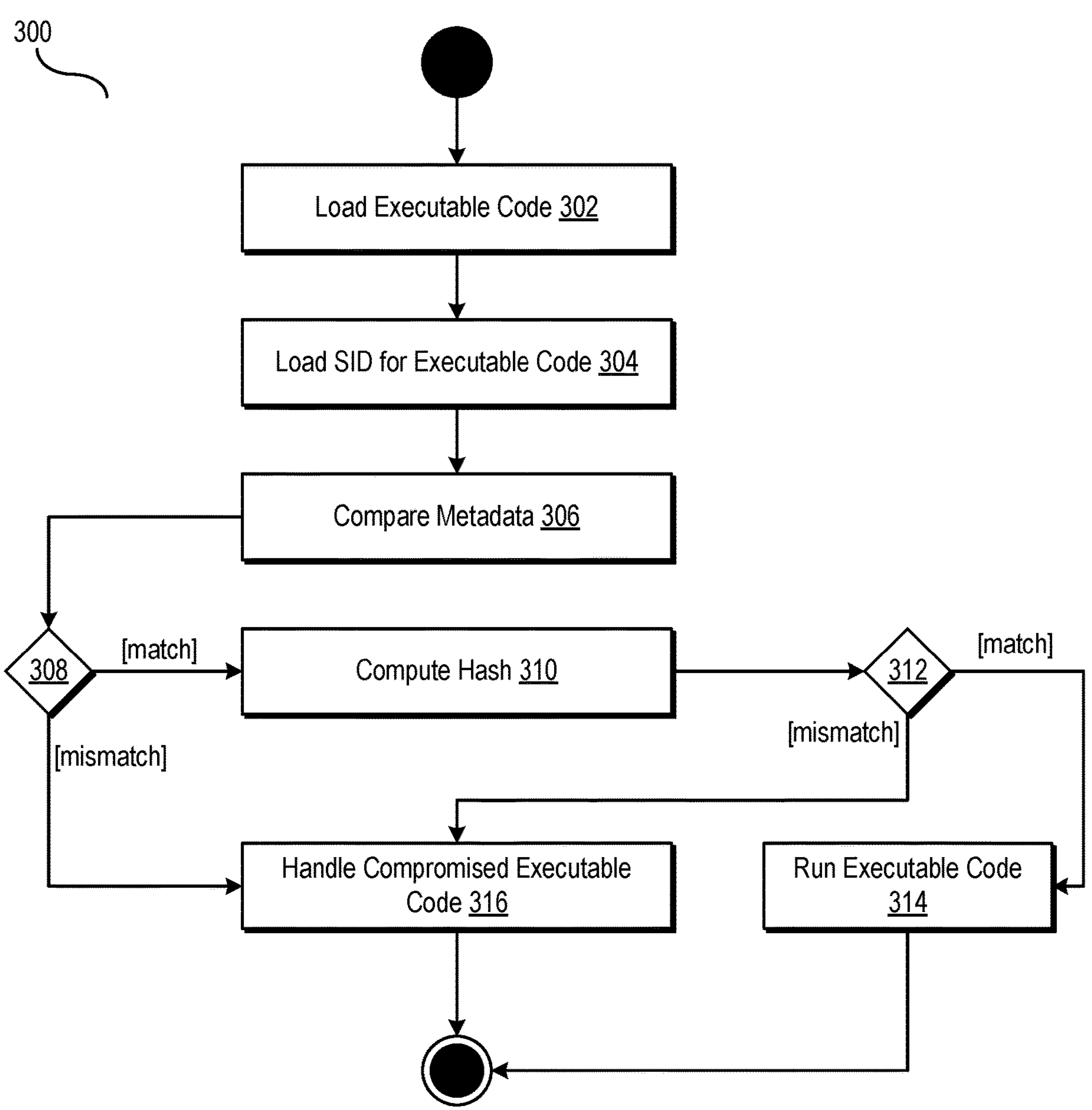
FIG. 3 is a flow diagram illustrating a method for detecting vulnerabilities in software according to some embodiments of the disclosure.

FIG. 3 is a flow diagram illustrating a method for detecting vulnerabilities in software according to some embodiments of the disclosure. In some implementations, method 300 can be executed by an operating system or similar type of software. In some implementations, method 300 can be executed by L1 code authenticated using method 200.

In step 302, method 300 can include loading executable code.

In some implementations, method 300 can be initiated by forking, spawning, or otherwise launching a process representing the executable code. In some implementations, the executable code can be a single-threaded process, application software, a daemon, or generally any type of executable code that may be run by an operating system. The disclosure is not limiting in the specific functions or classification of the executable code.

The executable code may be stored on a storage device (e.g., storage device 104). In general, the executable code may be stored in a write-accessible portion of a storage device and thus may potentially be corrupted or otherwise compromised. The executable code may be first written to the storage device via a secure write command. As described above, in these implementations, the executable code is verified and signed by a third-party using a private key corresponding to a secure public key in the storage device. For example, a KMS may sign executable code to store in the storage device and provide the signed executable code to the storage device (via, in some implementations, a processor or controller). As described in FIG. 1, this signed code may also include a signed SID for the code. Details of the contents of the SID are provided in FIG. 1 and not repeated herein.

In response, the storage device validates the signature (using the public key stored by the device) and persists the executable code if the signature is valid. Similarly, the storage device can persist the SID for the executable code in a write-protected region of the storage device.

In general, then, the initial version of the executable code can be confirmed when the SID is written. Thus, the SID can permanently (until properly changed) be associated with the expected executable code. As will be discussed, this correspondence can be leveraged to quickly validate the executable code corresponding to an SID entry. Further, while the preceding and foregoing descriptions focus on “executable code,” the same techniques can be applied to any data, including non-executable data. For example, a text file can be signed by the KMS and provided to the storage device along with an SID entry. Thus, any discussion of executable code applies equally to non-executable code. Indeed, step 314 for non-executable code may be replaced with any step that handles non-executable code (e.g., displaying a text file, playing back an audio or video file, printing a document, etc.).

In step 304, method 300 can include loading an SID entry for the executable code.

As described in FIG. 1, the SID entry can include various data fields related to the executable code. Details of those fields are not repeated herein but generally include a pre-computed TCI, measurement filenames (or memory locations) and sizes, manufacturer identifier, version number, build number, TCI level, etc. In step 304, the SID entry can be read from a write-protected region of the storage device. In general, this region allows any processes to read data but only allows signed commands to write data and this signed command must be signed with a private key corresponding to a KMS public key (or similar public key) saved in the device.

In step 306, method 300 can include comparing at least one metadata field in the SID to a corresponding metadata field of the executable code.

The executable code may be associated with the same types of metadata fields included in the SID (e.g., manufacturer, version, build, TCI level, etc.). Thus, in step 306, method 300 can determine if the current metadata (i.e., the metadata associated with the currently stored executable code) is consistent (e.g., matches) with the metadata written in the SID entry when the executable code was downloaded and saved. If, as an example, a malicious user replaces the executable code with malicious code, the metadata fields may differ. In some implementations, step 306 can include determining if all metadata fields match.

As illustrated in decision 308, if the metadata fields do not match, method 300 will proceed to handle the compromised executable code. In some scenarios, step 316 can include stopping the loading of the executable code to prevent the executable code from running. Further, in some scenarios, method 300 can also take further or remedial measures such as deleting the executable code, alerting the user, or providing other forms of notification of the mismatch.

By contrast, when method 300 determines that the metadata field(s) match, method 300 can proceed to step 310 where it computes a hash or current digest of the executable code.

In some implementations, the SID stores the filename and size (or memory locations and corresponding sizes) for measuring. Since this data is in the SID and in write-protected memory, they cannot be tampered with. Thus, method 300 can ensure that the same data is measured each time. For example, a malicious executable code could not modify the measurement location to point to an "old" version of the code and thus bypass measurement. As discussed, in most implementations, the filename and size of the executable code will be used to measure the executable code. However, explicitly memory locations and sizes may also be used. In some implementations, a hash function (e.g., SHA-256) can be used to compute the digest. In general, any suitable one-way function can be used provided it is the same function used to generate the digest stored in the SID (as will be discussed).

Notably, in contrast to existing threat detection systems (e.g., antivirus), the use of digests dramatically decreases the amount of time method 300 spends analyzing executable code. For example, given a ten megabyte file, computing a SHA-256 digest takes approximately 70 milliseconds (0.07 s) on a standard personal computer. By contrast, a byte-by-byte analysis of the same file can take multiple seconds (e.g., approximately three seconds assuming a one nanosecond-per-byte processing requirement and associated file reading overhead). Further, when using file reading, the speed of scanning is unpredictable and dependent on the size of data. By contrast, using digests ensures that processing speeds do not increase linearly with the file size. Indeed, computing a digest of a 100 MB file takes approximately 0.4 seconds on a standard personal computer while a one-nanosecond byte-by-byte scan takes approximately 25 seconds. These benefits necessarily increase as the file size of the executable code increases.

In step 312, method 300 can include determining if the current digest (computed based on a version of the executable code) matches the digest in the SID file. In an implementation, this comparison comprises determining if the two digest are equal or identical. If so, method 300 proceeds to step 314 where the executable code is run. Specifically, when the digest of the executable code matches the stored digest (which is saved in a write-protected region) match, method 300 can guarantee that the executable code is as expected and not tampered with. By contrast, if method 300 determines that the digests do not match, method 300 can halt the execution of the executable code in step 316 and (optionally) take corrective measures as described previously.

In contrast to existing anti-virus techniques, any time an attack occurs, method 300 can be run and will be detected. That is, in some implementations, method 300 can be executed each time a process or other executable code is run. Since the underlying overhead of loading the SID entry and computing a digest are low, method 300 does not negatively impact performance and can be run via (for example) a background process (similar to garbage collection routines) and monitor all executable code associated with an SID entry. Thus, using method 300, a computing system does not need to run a regularly scheduled anti-virus process to check executable code, Further, the SID-based approach can isolate virus detection to specific software, drivers, files, etc. and does not require a full disk scan to detect malicious code which additionally reduces the processing power dedicated to virus detection. Further, method 300 can detect viruses in real-time and accurately identify which code or data is affected. Thus, method 300 provides a means for quickly ensuring the integrity of executable code.

Figure 4:
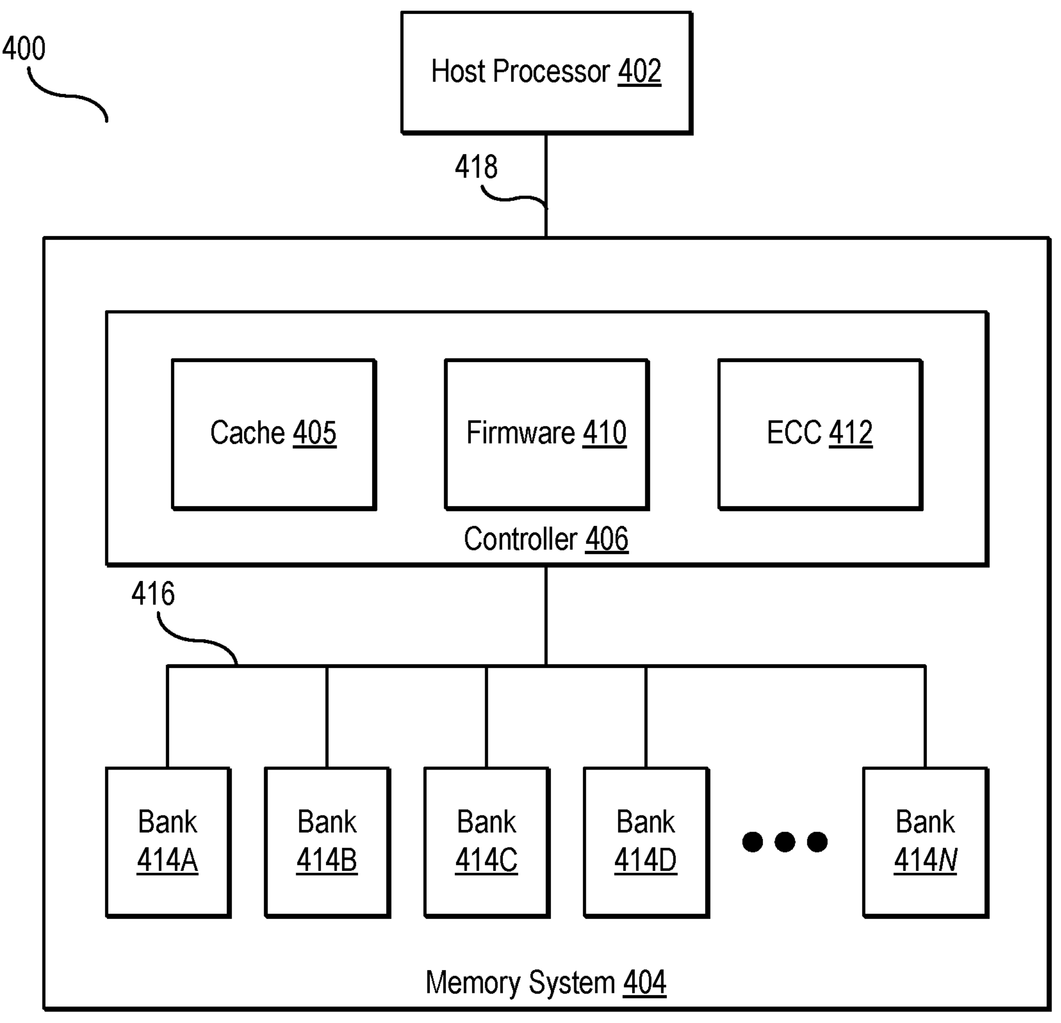
FIG. 4 is a block diagram illustrating a memory system according to some embodiments of the disclosure.

FIG. 4 is a block diagram illustrating a memory system according to some embodiments of the disclosure.

As illustrated in FIG. 4, a computing system 400 includes a host processor 402 communicatively coupled to a memory system 404 via a bus 418. The memory system 404 comprises a controller 406 communicatively coupled to one or more memory banks 414A-414N, forming a memory array via a bus/interface 416. As illustrated, controller 406 includes a local cache 405, firmware 410, and an error correction code (ECC) module 412.

In the illustrated embodiment, a host processor 402 can comprise any type of computer processor, e.g., a central processing unit (CPU), graphics processing unit (GPU), or other types of general-purpose or special-purpose computing devices. The host processor 402 includes one or more output ports that allow for the transmission of address, user, and control data between the host processor 402 and the memory system 404. In the illustrated embodiment, this communication is performed over the bus 418. In one embodiment, the bus 418 comprises an input/output (I/O) bus or a similar type of bus.

The memory system 404 is responsible for managing one or more memory banks 414A-414N. In one embodiment, the banks 414A-414N comprise NAND Flash dies or other configurations of non-volatile memory. In one embodiment, the memory banks 414A-414N comprise a memory array.

The banks 414A-414N are managed by the controller 406. In some embodiments, controller 406 comprises a computing device configured to mediate access to and from banks 414A-414N. In one embodiment, controller 406 comprises an ASIC or other circuitry installed on a printed circuit board housing the banks 414A-414N. In some embodiments, the controller 406 may be physically separate from the banks 414A-414N. Controller 406 communicates with the banks 414A-414N over interface 416. In some embodiments, this interface 416 comprises a physically wired (e.g., traced) interface. In other embodiments, the interface 416 comprises a standard bus for communicating with banks 414A-414N.

Controller 406 comprises various modules 405-412. In one embodiment, the various modules 405-412 comprise various physically distinct modules or circuits. In other embodiments, the modules 405-412 may completely (or partially) be implemented in software or firmware.

As illustrated, firmware 410 comprises the core of the controller and manages all operations of the controller 406. Firmware 410 may implement some or all the methods described above.

Figure 5:
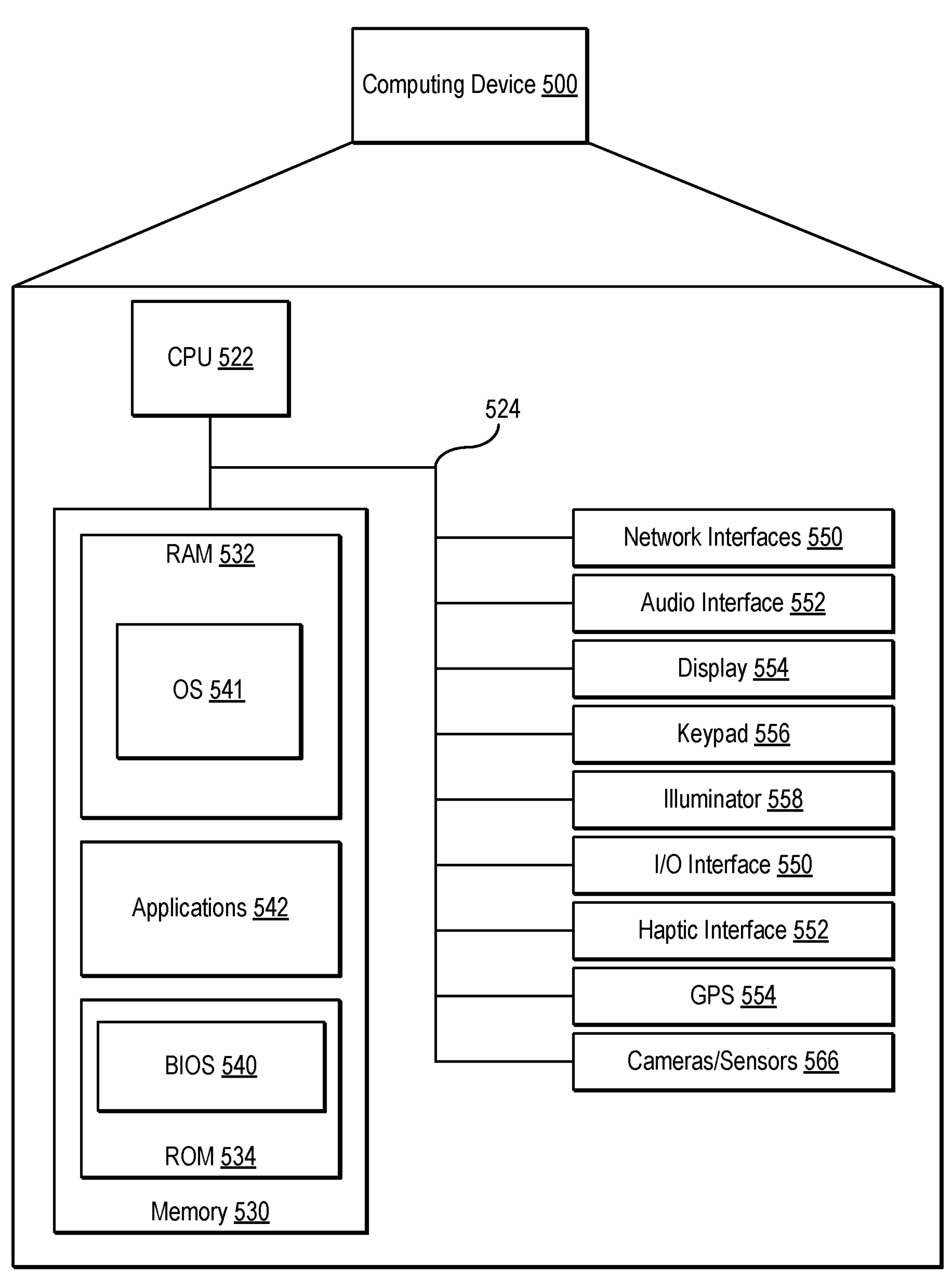
FIG. 5 is a block diagram illustrating a computing device showing an example of a client or server device used in the various embodiments of the disclosure.

FIG. 5 is a block diagram illustrating a computing device showing an example of a client or server device used in the various embodiments of the disclosure.

The computing device 500 can include more or fewer components than those shown in FIG. 5, depending on the deployment or usage of the device 500. For example, a server computing device, such as a rack-mounted server, may not include audio interfaces 552, displays 554, keypads 556, illuminators 558, haptic interfaces 562, Global Positioning Service (GPS) receivers 564, or cameras/sensors 566. Some devices can include additional components not shown, such as graphics processing unit (GPU) devices, cryptographic co-processors, artificial intelligence (AI) accelerators, or other peripheral devices.

As shown in the figure, device 500 includes a central processing unit (CPU) 522 in communication with a mass memory 530 via a bus 524. The computing device 500 also includes one or more network interfaces 550, an audio interface 552, a display 554, a keypad 556, an illuminator 558, an input/output interface 560, a haptic interface 562, an optional global positioning systems (GPS) receiver 564 and a camera(s) or other optical, thermal, or electromagnetic sensors 566. Device 500 can include one camera/sensor 566 or a plurality of cameras/sensor 566. The positioning of the camera(s)/sensor(s) 566 on the device 500 can change per device 500 model, per device 500 capabilities, and the like, or some combination thereof.

In some embodiments, the CPU 522 can comprise a general-purpose CPU. The CPU 522 can comprise a single-core or multiple-core CPU. The CPU 522 can comprise a system-on-A-chip (SoC) or a similar embedded system. In some embodiments, a GPU can be used in place of, or in combination with, a CPU 522. Mass memory 530 can comprise a dynamic random-access memory (DRAM) device, a static random-access memory device (SRAM), or a Flash (e.g., NAND Flash) memory device. In some embodiments, mass memory 530 can comprise a combination of such memory types. In one embodiment, the bus 524 can comprise a Peripheral Component Interconnect Express (PCIe) bus. In some embodiments, the bus 524 can comprise multiple buses instead of a single bus.

Mass memory 530 illustrates another example of computer storage media for the storage of information such as computer-readable instructions, data structures, program modules, or other data. Mass memory 530 stores a basic input/output system ("BIOS") 540 for controlling the low-level operation of the computing device 500. In the illustrated embodiment, the BIOS 540 may be stored in a read-only memory (ROM) such as ROM 534. The mass memory also stores an operating system 541 for controlling the operation of the computing device 500

Applications 542 can include computer-executable instructions which, when executed by the computing device 500, perform any of the methods (or portions of the methods) described previously in the description of the preceding Figures. In some embodiments, the software or programs implementing the method embodiments can be read from a hard disk drive (not illustrated) and temporarily stored in RAM 532 by CPU 522. CPU 522 can then read the software or data from RAM 532, process them, and store them in RAM 532 again.

The computing device 500 can optionally communicate with a base station (not shown) or directly with another computing device. Network interface 550 is sometimes known as a transceiver, transceiving device, or network interface card (NIC).

The audio interface 552 produces and receives audio signals such as the sound of a human voice. For example, the audio interface 552 can be coupled to a speaker and microphone (not shown) to enable telecommunication with others or generate an audio acknowledgment for some action. Display 554 can be a liquid crystal display (LCD), gas plasma, light-emitting diode (LED), or any other type of display used with a computing device. Display 554 can also include a touch-sensitive screen arranged to receive input from an object such as a stylus or a digit from a human hand.

Keypad 556 can comprise any input device arranged to receive input from a user. Illuminator 558 can provide a status indication or provide light.

The computing device 500 also comprises an input/output interface 560 for communicating with external devices, using communication technologies, such as USB, infrared, Bluetooth®, or the like. The haptic interface 562 provides tactile feedback to a user of the client device.

The optional GPS receiver 564 can determine the physical coordinates of the computing device 500 on the surface of the Earth, which typically outputs a location as latitude and longitude values. GPS receiver 564 can also employ other geo-positioning mechanisms, including, but not limited to, triangulation, assisted GPS (AGPS), E-OTD, CI, SAI, ETA, BSS, or the like, to further determine the physical location of the computing device 500 on the surface of the Earth. In one embodiment, however, the computing device 500 can communicate through other components, providing other information that can be employed to determine the physical location of the device, including, for example, a MAC address, IP address, or the like.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to the desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product or software that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as read-only memory ("ROM"), random access memory ("RAM"), magnetic disk storage media, optical storage media, flash memory components, etc.

In this description, various functions and operations are described as being performed by or caused by computer instructions to simplify the description. However, those skilled in the art will recognize what is meant by such expressions is that the functions result from the execution of the computer instructions by one or more controllers or processors, such as a microprocessor. Alternatively, or in combination, the functions and operations can be implemented using special-purpose circuitry, with or without software instructions, such as using Application-Specific Integrated Circuit (ASIC) or Field-Programmable Gate Array (FPGA). Embodiments can be implemented using hardwired circuitry without software instructions or in combination with software instructions. Thus, the techniques are limited neither to any specific combination of hardware circuitry and software nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

loading data from a storage device;

loading secure identifying data (SID) associated with the data from a write-protected region of the storage device, the SID including a digest, a metadata struct identifying one or more measurement locations for measuring the data, and at least one other metadata field;

comparing the at least one other metadata field in the SID to a corresponding metadata field of the data;

determining whether the at least one other metadata field in the SID matches the corresponding metadata field of the data;

computing a current digest of the data based on the one or more measurement locations identified in the metadata struct;

comparing the current digest to the digest in the SID; and validating the data only when the at least one other metadata field in the SID matches the corresponding metadata field of the data and the current digest matches the digest in the SID.

2. The method of claim 1, wherein loading data from the storage device comprises loading executable code from the storage device.

3. The method of claim 1, wherein loading data from the storage device comprises loading the data from a writeable portion of the storage device.

4. The method of claim 1, wherein the SID further includes a filename and size of the data.

5. The method of claim 4, wherein the current digest is computed using the filename and size of the data.

6. The method of claim 1, wherein the at least one other metadata field comprises one of a manufacturer, version, or build.

7. The method of claim 1, wherein the current digest and the digest in the SID are generated using a one-way function.

8. A non-transitory computer-readable storage medium for tangibly storing computer program instructions capable of being executed by a computer processor, the computer program instructions defining steps of:

loading data from a storage device;

loading secure identifying data (SID) associated with the data from a write-protected region of the storage device, the SID including a digest, a metadata struct identifying one or more measurement locations for measuring the data, and at least one other metadata field;

comparing the at least one other metadata field in the SID to a corresponding metadata field of the data;

determining whether the at least one other metadata field in the SID matches the corresponding metadata field of the data;

computing a current digest of the data based on the one or more measurement locations identified in the metadata struct;

comparing the current digest to the digest in the SID; and validating the data only when the at least one other metadata field in the SID matches the corresponding metadata field of the data and the current digest matches the digest in the SID.

9. The non-transitory computer-readable storage medium of claim 8, wherein loading data from the storage device comprises loading executable code from the storage device.

10. The non-transitory computer-readable storage medium of claim 8, wherein loading data from the storage device comprises loading the data from a writeable portion of the storage device.

11. The non-transitory computer-readable storage medium of claim 8, wherein the SID further includes a filename and size of the data.

12. The non-transitory computer-readable storage medium of claim 11, wherein the current digest is computed using the filename and size of the data.

13. The non-transitory computer-readable storage medium of claim 8, wherein the at least one other metadata field comprises one of a manufacturer, version, or build.

14. The non-transitory computer-readable storage medium of claim 8, wherein the current digest and the digest in the SID are generated using a one-way function.

15. A device comprising:

a storage device, the storage device including a write-protected region; and a processor configured for:

loading data from the storage device;

loading secure identifying data (SID) associated with the data from the write-protected region of the storage device, the SID including a digest, a metadata struct identifying one or more measurement locations for measuring the data, and at least one other metadata field;

comparing the at least one other metadata field in the SID to a corresponding metadata field of the data;

determining whether the at least one other metadata field in the SID matches the corresponding metadata field of the data;

computing a current digest of the data based on the one or more measurement locations identified in the metadata struct;

comparing the current digest to the digest in the SID; and validating the data only when the at least one other metadata field in the SID matches the corresponding metadata field of the data and the current digest matches the digest in the SID.

16. The device of claim 15, wherein loading data from the storage device comprises loading executable code from the storage device.

17. The device of claim 15, wherein loading data from the storage device comprises loading the data from a writeable portion of the storage device.

18. The device of claim 15, wherein the SID further includes a filename and size of the data.

19. The device of claim 18, wherein the current digest is computed using the filename and size of the data.

20. The device of claim 15, wherein the at least one other metadata field comprises one of a manufacturer, version, or build.

* * * * *